(12) United States Patent
O'Donnell et al.

(10) Patent No.: US 11,447,167 B2
(45) Date of Patent: Sep. 20, 2022

(54) SHOPPING TROLLEY

(71) Applicant: Shoppacart Pty Ltd, Greenmount (AU)

(72) Inventors: Jeanne Louise O'Donnell, Greenmount (AU); Edward Joseph Khoury, Bateman (AU); Ross Khoury, Bateman (AU)

(*) Notice: Subject to any disclaimer, the term of this patent is extended or adjusted under 35 U.S.C. 154(b) by 0 days.

(21) Appl. No.: 17/297,399

(22) PCT Filed: Nov. 22, 2019

(86) PCT No.: PCT/AU2019/051287
§ 371 (c)(1),
(2) Date: May 26, 2021

(87) PCT Pub. No.: WO2020/107061
PCT Pub. Date: Jun. 4, 2020

(65) Prior Publication Data
US 2022/0032984 A1  Feb. 3, 2022

(30) Foreign Application Priority Data

Nov. 26, 2018 (AU) .............................. 2018904492
Nov. 27, 2018 (AU) .............................. 2018904510
(Continued)

(51) Int. Cl.
*B62B 3/02* (2006.01)
*B62B 5/00* (2006.01)

(52) U.S. Cl.
CPC ............ *B62B 3/027* (2013.01); *B62B 5/0003* (2013.01); *B62B 2205/003* (2013.01); *B62B 2205/04* (2013.01); *B62B 2205/12* (2013.01)

(58) Field of Classification Search
CPC ........... B62B 3/027; B62B 3/025; B62B 3/02; B62B 5/0003; B62B 2205/003; B62B 2205/04; B62B 2205/12; B62B 5/003
See application file for complete search history.

(56) References Cited

U.S. PATENT DOCUMENTS 8,333,404 B2 * 12/2012 Moster ................... B62B 3/027
280/38
9,573,610 B1 * 2/2017 Chaturvedi ............. B62B 3/022
(Continued)

FOREIGN PATENT DOCUMENTS

DE           19611542 A1 * 9/1997 ............. B62B 3/027

*Primary Examiner* — John D Walters
(74) *Attorney, Agent, or Firm* — Tope-McKay & Associates

(57) ABSTRACT

A shopping trolley (10) comprising a basket (12) having first and second side walls (22, 23), first and second end walls (20, 21) and a base wall (18). The basket 12 includes first and second front legs (26, 27) and first and second rear legs (28, 29). The first and second front legs (26, 27) are rotatable from an extended position, in which they extend downwardly from adjacent a front of the basket 12, to a collapsed position, in which they are located adjacent outer sides of the first and second side walls (22, 23). The rear legs (28, 29) are rotatable from an extended position, in which they extend downwardly from adjacent a rear of the basket, to a collapsed position, in they are located adjacent and above upper edges of the first and second side walls (22, 23) of the basket (12).

23 Claims, 21 Drawing Sheets

(30) Foreign Application Priority Data

May 29, 2019 (AU) .............................. 2019901845
Oct. 7, 2019 (AU) .............................. 2019903768

(56) References Cited

U.S. PATENT DOCUMENTS

| | | | |
|---|---|---|---|
| 10,232,867 B1* | 3/2019 | Jones | B62B 3/027 |
| 2016/0347341 A1* | 12/2016 | Tauber | B62B 5/0003 |
| 2020/0223465 A1* | 7/2020 | Geffen | B62B 3/027 |

* cited by examiner

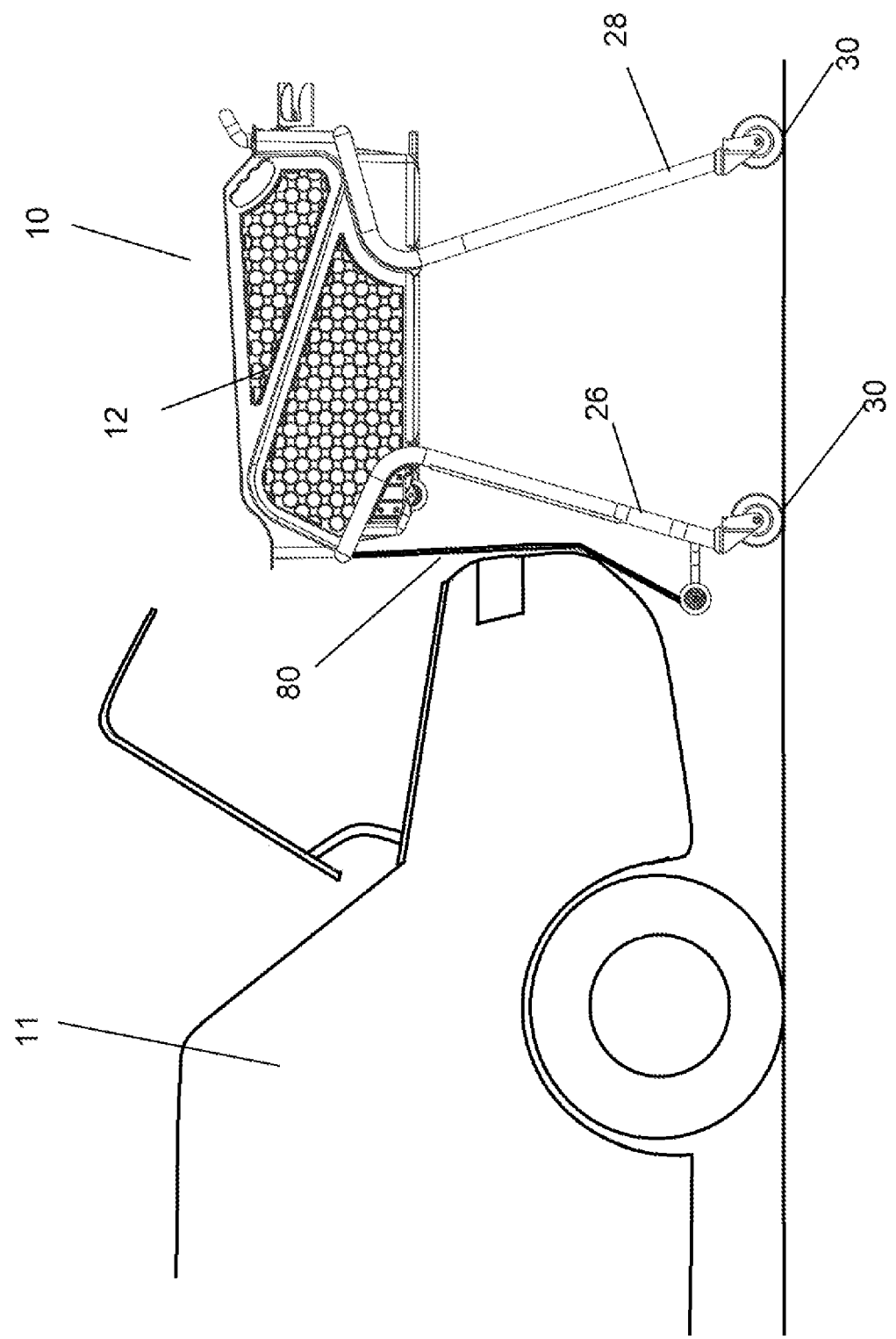

SHOPPING TROLLEY

FIELD OF THE INVENTION

The present invention relates to a shopping trolley.

BACKGROUND TO THE INVENTION

As many countries are restricting the use of single-use plastic bags in supermarkets, consumers are often required to take their own bags when going shopping. While shopping, it is usual though to use a shopping trolley provided by the supermarket and then transfer purchased items from the shopping trolley to the bags at the checkout.

The present invention relates to a shopping trolley which may be owned by the consumer and taken to and from the supermarket so that purchased items may be placed directly in the shopping trolley in the supermarket and remain in the shopping trolley to be transported to the consumer's home. The shopping trolley includes features aimed at making the trolley easy to use, and easy to move in and out of a vehicle.

SUMMARY OF THE INVENTION

According to one aspect of the present invention there is provided a shopping trolley comprising:
a basket having first and second side walls, first and second end walls and a base wall;
first and second front legs, each having a wheels on a lower end thereof; and first and second rear legs, each having a wheel on a lower end thereof;
wherein the first and second front legs are rotatable from an extended position, in which the first and second front legs extend downwardly from adjacent a front of the basket, to a collapsed position, in which the first and second front legs are located adjacent outer sides of the first and second side walls of the basket respectively, and the rear legs are rotatable from an extended position, in which the first and second rear legs extend downwardly from adjacent a rear of the basket, to a collapsed position, in which portions of the first and second rear legs are located adjacent and above upper edges of the first and second side walls of the basket respectively Preferably the first and second front legs are rotatably connected to outer surfaces of the side walls of the basket and the first and second rear legs are rotatably connected to the basket within recessed portions of the first and second side walls.

Preferably the first and second rear legs are receivable inside the first and second front legs as the front legs move from the extended to the collapsed position.

Preferably a front cross member extends between the first and second front legs such that the front cross member engages the first and second rear legs as the front legs move to the collapsed position.

Preferably the first and second front legs and the first and second rear legs each include a first end portion adjacent the first end thereof and a second end portion extending from the first end portion to the second end wherein the second portion is at an angle to the first end portion.

Preferably when the front and rear legs are in the extended positions, the first end portions of the first and second front legs are oriented to extend from adjacent the first end wall in a direction downwardly and rearwardly relative to the basket, the second end portions of the first and second front legs extend from the first end portions in a direction downwardly and forwardly relative to the basket, the first end portions of the first and second rear legs are oriented to extend from adjacent the second end wall in a direction downwardly and forwardly relative to the basket and the second end portions of the first and second rear legs extend from the first end portions in a direction downwardly and rearwardly relative to the basket.

Preferably the first end portions of the first and second front legs are rotatably connected to the basket on outer surfaces of the first and second side walls respectively adjacent the first end wall and the first end portions of the rear legs are rotatably connected to the basket within the recessed portions located adjacent the second end wall.

In a preferred embodiment, the first and second side walls of the basket are each provided with an outwardly extending wall portion extending from a location above the junction between the base wall and the first end wall to a location located rearwardly of the junction between the base wall and the first end wall such that the first end portions of the first and second front legs rest on upper surfaces of the wall portions in the extended position.

Preferably the recessed portions in the first and second side walls each define a first shoulder portion extending from a location above the junction between the base wall and the second end wall to a location forwardly of the junction between the base wall and the second end wall such that the first end portions of the first and second rear legs rest under the first shoulder portions in the extended position.

Preferably, in the collapsed position, the first end portions of the first and second rear legs are located adjacent rear edges of the first and second side walls and the second end portions of the first and second rear legs are located adjacent and above upper edges of the first and second side walls.

Preferably the upper edges of the first and second side walls each include a recessed end portion adjacent the first end wall such that the recessed end portions receive the wheels of the first and second rear legs in the collapsed position.

In a preferred embodiment, outer surfaces of the first and second side walls of the basket include second shoulder portions defining downwardly facing surfaces extending along the first and second side walls from adjacent the first end wall to adjacent the second end wall, the downwardly facing surfaces of the second shoulder portions corresponding to the shape of the first and second front legs such that the first and second front legs engage against the downwardly facing surfaces of the second shoulder portions in the collapsed position.

Preferably the front and rear legs are maintained in the extended positions by locking members.

Preferably the locking members extend outwardly from the first and second side walls to engage with each of the front and rear legs to restrict rotation of the front and rear wheel support frames away from the extended position.

In a preferred embodiment, the locking members each comprises a pin mounted with a housing provided on a lower surface of the base wall such that each of the pins is extendible outwardly from the base wall to engage into a hole in one of the front or rear legs.

Preferably the pins are spring biased relative to the respective housings such that a distal end of each of the pins is moved outwardly by the spring bias to engage into the hole Preferably an actuator is connected to each of the pins such that operation of the actuator retracts the pins away from the legs to release the front and rear wheel support frames to rotate towards the collapsed position.

Preferably the actuator comprises a handle mounted adjacent a rear edge of the base wall of the basket connected via cables to the housings such that operation of the handle causes retraction of the pins.

Preferably secondary wheels are provided on which the shopping trolley may be moved when the front and rear support frames are in the collapsed position.

In a preferred embodiment, a first pair of secondary wheels is provided on a lower surface of the base wall of the basket adjacent the first end wall and a second pair of secondary wheels is provided on a front cross member extending between the first and second front legs.

Preferably one or more straps is provided extending from a front end of the basket to the front wheel support frame such that the straps engage with a rear of a vehicle before the front wheel support frame.

Preferably the straps are elasticised.

Preferably the straps have first ends connected to a first end wall of the basket and second ends connected to a first cross member extending between the first and second front legs.

BRIEF DESCRIPTION OF THE DRAWINGS

The invention will now be described, by way of example, with reference to the following drawings, in which:

FIG. 21 is a side view of the shopping trolley engaging against the rear of a vehicle.

DETAILED DESCRIPTION OF PREFERRED EMBODIMENTS

Figure 1:
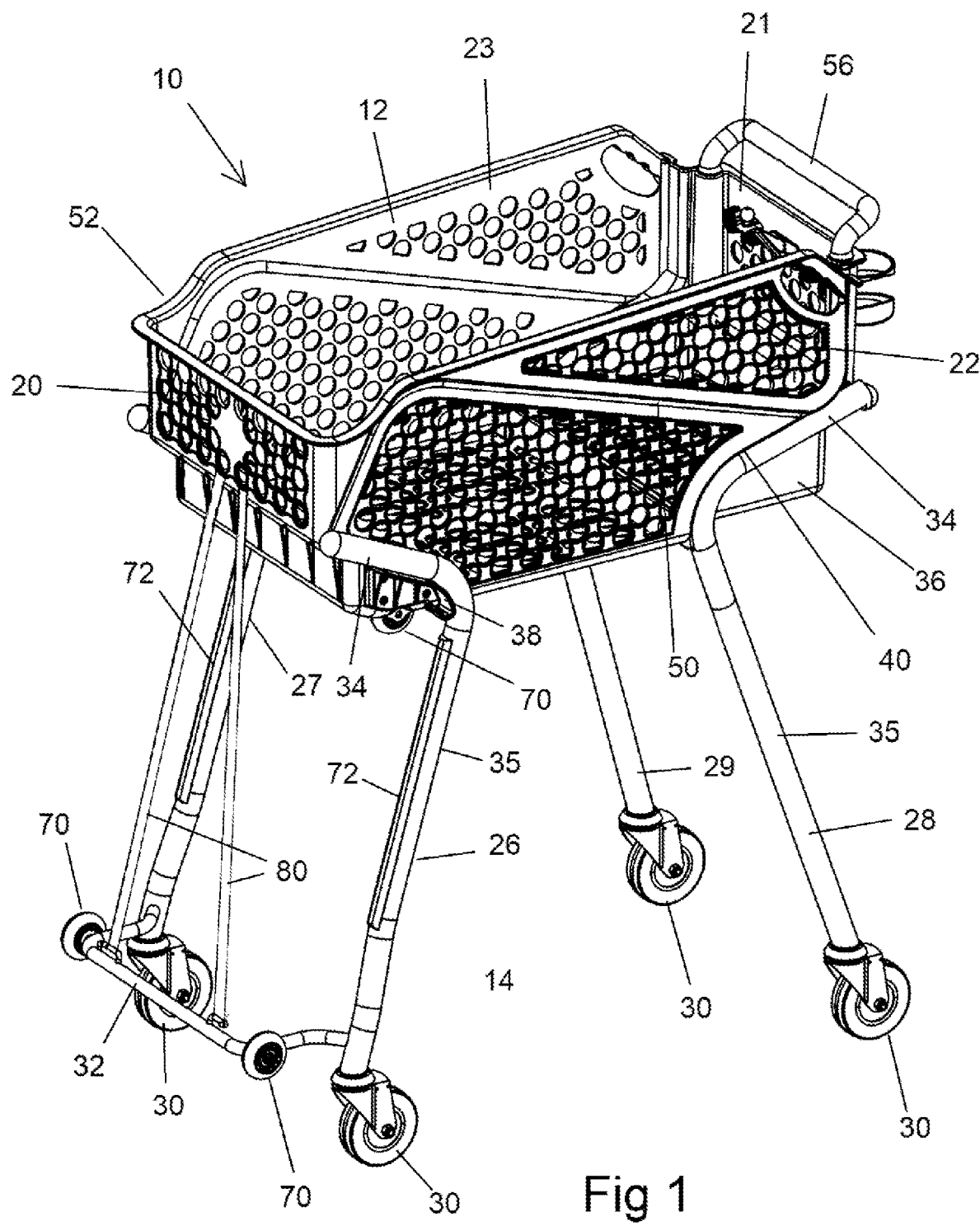
FIG. 1 is an upper perspective view of a shopping trolley in accordance with the present invention.
Figure 2:
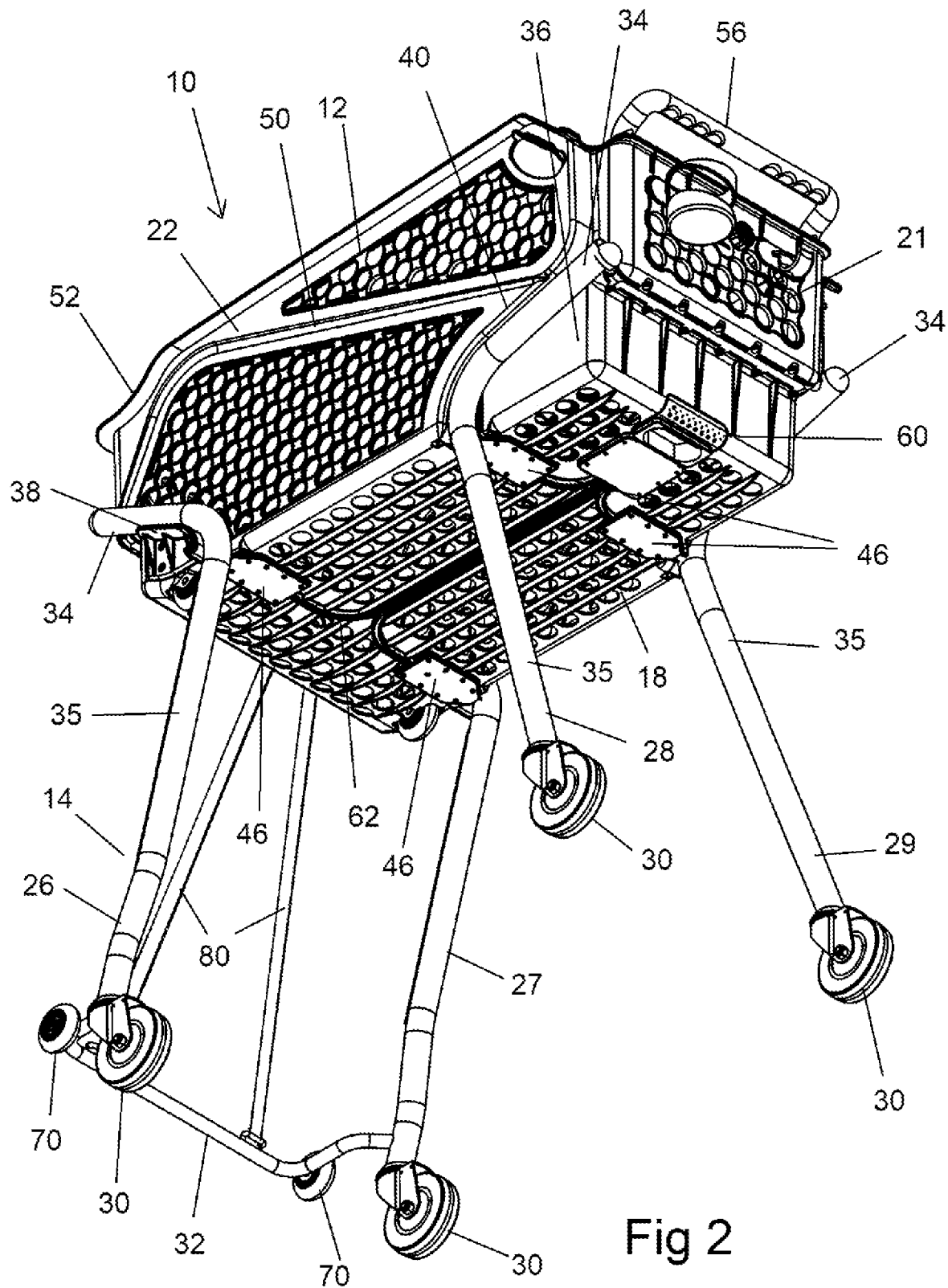
FIG. 2 is a lower perspective view of the shopping trolley of FIG. 1.
Figure 3:
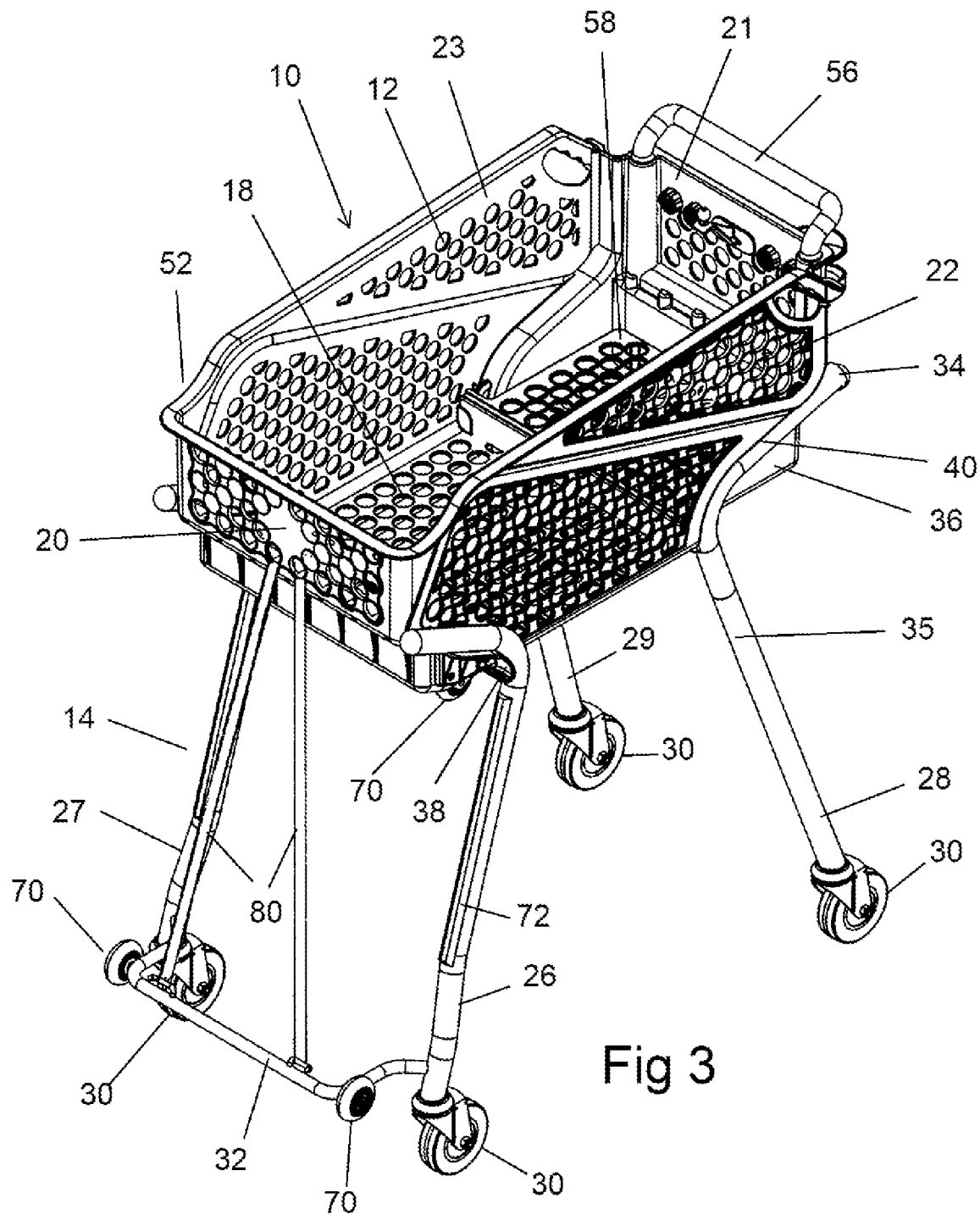
FIG. 3 is a second upper perspective view of the shopping trolley of FIG. 1.
Figure 4:
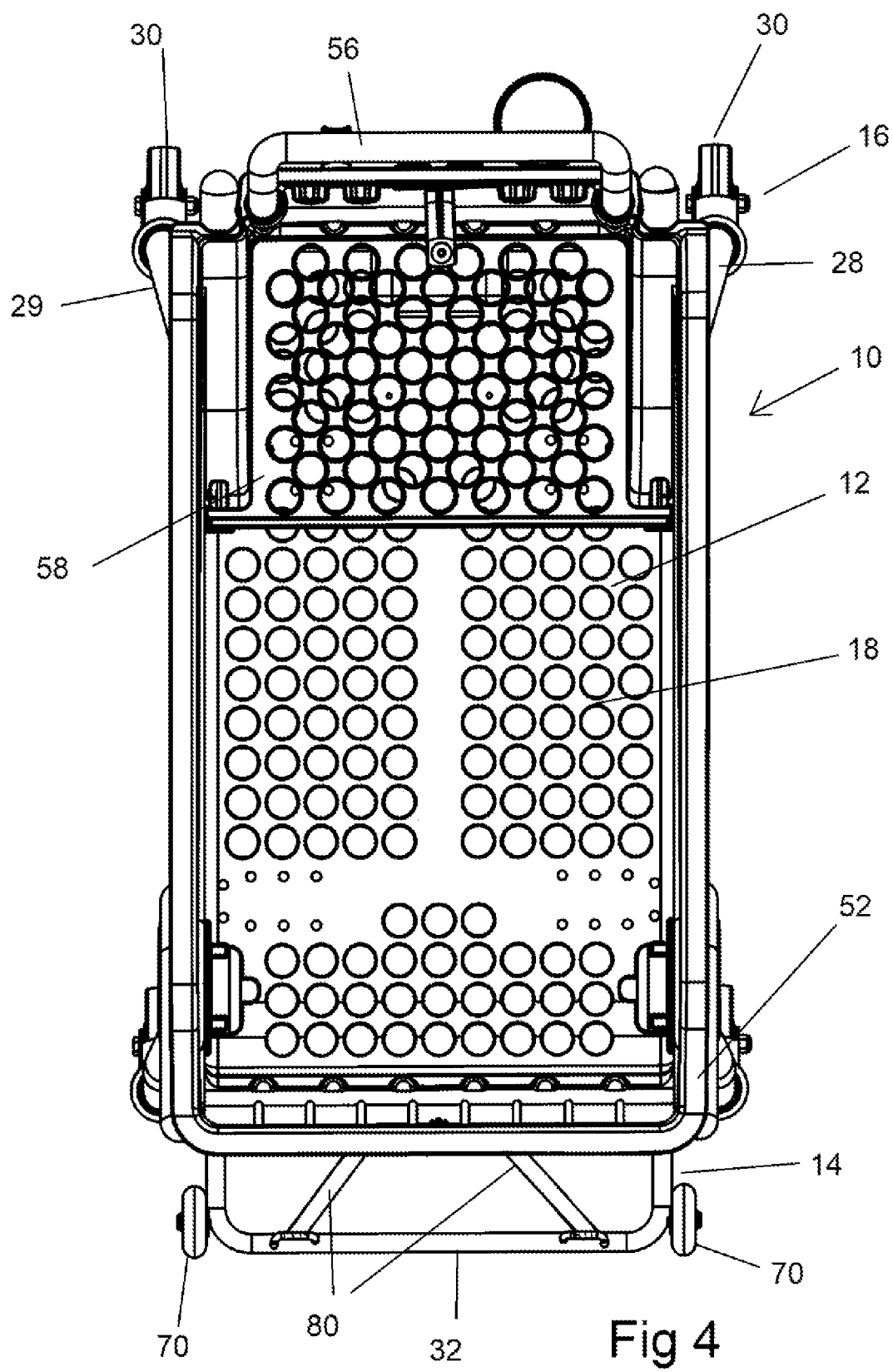
FIG. 4 is a top view of the shopping trolley of FIG. 1.
Figure 5:
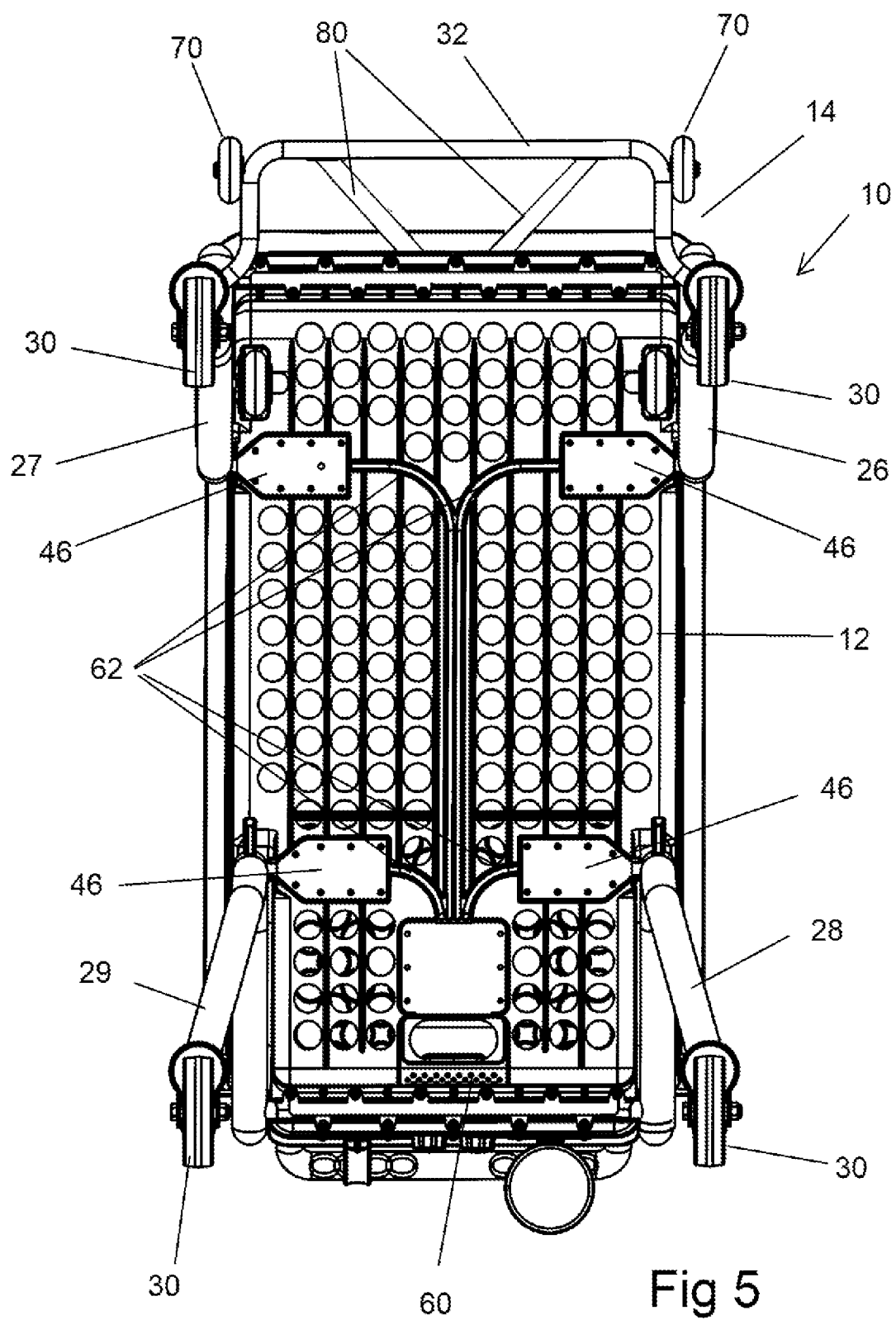
FIG. 5 is a bottom view of the shopping trolley of FIG. 1.
Figure 6:
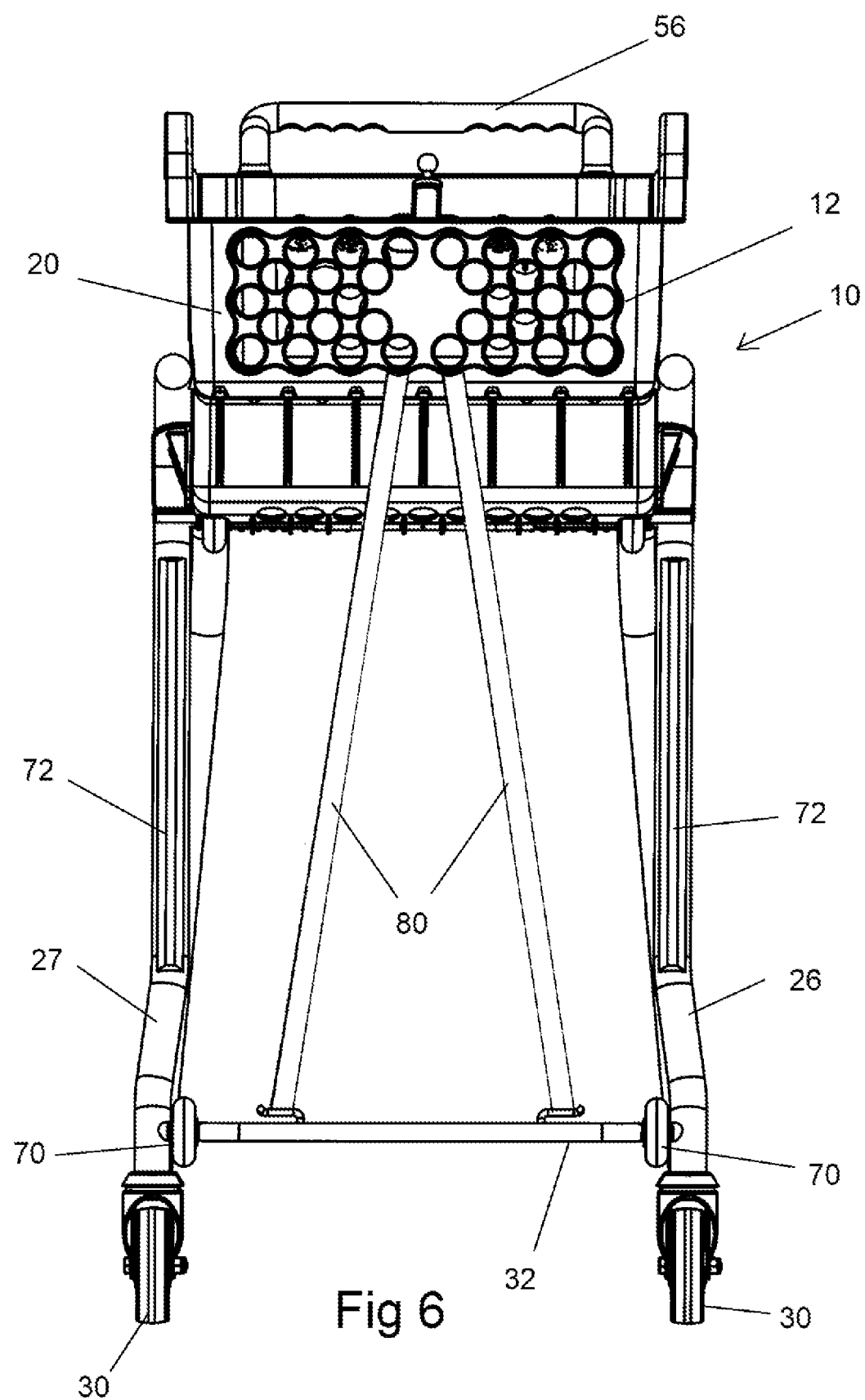
FIG. 6 is a front view of the shopping trolley of FIG. 1.
Figure 7:
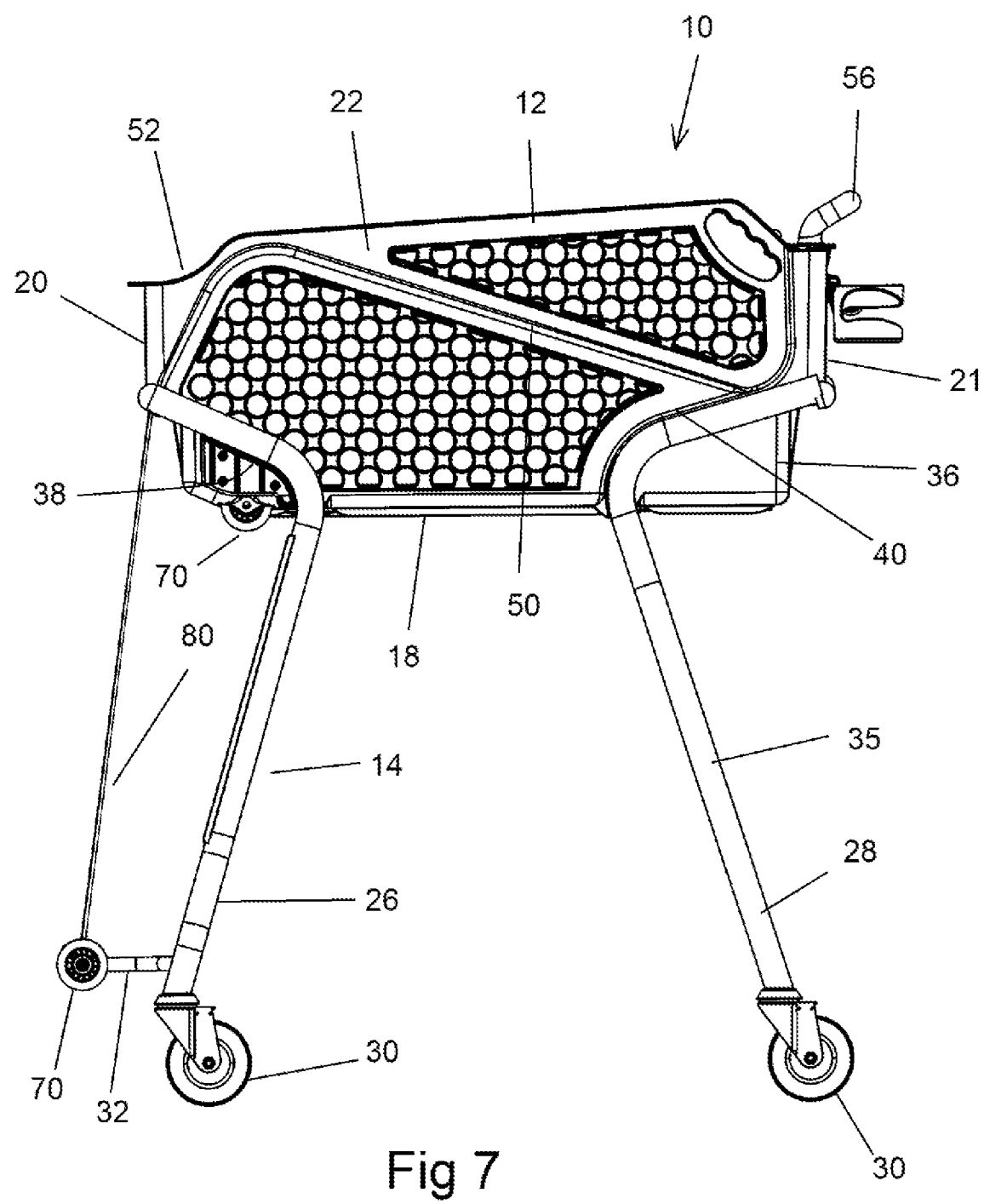
FIG. 7 is a side view of the shopping trolley of FIG. 1.

Referring to the Figures, there is shown a shopping trolley 10 comprising generally a basket 12, first and second front legs 26 and 27 and first and second rear legs 28 and 29. The basket 12 comprises an open topped receptacle and is formed from a base wall 18, first and second end walls 20 and 21 and first and second side walls 22 and 23. The first and second side walls 22 and 23 and the first and second end walls 20 and 21 extend upwardly from around the periphery of the base wall 18 to define the open topped receptacle. In the embodiment shown, each of the base wall 18, the first and second side walls 22 and 23 and the first and second end walls 20 and 21 are generally rectangular in shape.

Each of the first and second front legs 26 and 27 and the first and second rear legs 28 and 29 is connected to the basket 12 at a first end thereof and includes a wheel 30 at a second end thereof. The first ends of the first and second front legs 26 and 27 and the first and second rear legs 28 and 29 are rotatably connected to the basket 12 such that the front and rear legs 26, 27, 28, 29 are each rotatable between an extended position (as shown in FIGS. 1 to 8) and a collapsed position (as shown in FIGS. 13 to 20). In the extended positions, the front and rear legs 26, 27, 28, 29 extend downwardly from adjacent the front and rear of the basket 12 respectively such that the shopping trolley 10 rests on the wheels 30 and may be manoeuvred around in a known manner.

The front legs 26 and 27 are connected in the embodiment shown by a front cross member 32 such that front legs 26 and 27 form a front wheel support frame 14. The front cross member 32 extends between the first and second front legs 26 and 27 adjacent the second ends thereof.

In the embodiment shown, the first and second rear legs 28 and 29 are not connected to each other such that they may rotate separately relative to the basket 12. In an alternative embodiment however (not shown), the first and second rear legs 28 and 29 may be connected with a rear cross member to form a rear wheel support frame.

The first and second front legs 26 and 27 each include a first end portion 34 adjacent the first end thereof and a second end portion 35 extending from the first end portion 34 to the second end. The first end portions 34 of the first and second front legs 26 and 27 are rotatably connected to the basket 12 such that the first end portions 34 are located adjacent outer surfaces of the first and second side walls 22 and 23 respectively adjacent the first end wall 20.

The first and second rear legs 28 and 29 also each include a first end portion 34 adjacent the first end thereof and a second end portion 35 extending from the first end portion 34 to the second end. The first and second side walls 22 and 23 of the basket 12 each include a recessed portion 36 adjacent the junction between the base wall 18 and the second end wall 21. The first end portions 34 of the rear legs 28 and 29 are rotatably connected to the basket 12 within the recessed portions 36 such that the first and second rear legs 28 and 29 do not protrude laterally outwardly beyond the extents of the first and second side walls 22 and 23. Therefore, as the front and rear legs 26, 27, 28, 29 rotate from the extended position to the collapsed position, the first and second rear legs 28 and 29 are received between the first and second front legs 26 and 27.

The first end portions 34 of the first and second front legs 26 and 27 are oriented to extend from adjacent the first end wall 20 in a direction downwardly and rearwardly relative to the basket 12 when the front wheel support frame 14 is in the extended position. The second end portions 35 of the first and second front legs 26 and 27 extend from the first end portions 34 in a direction downwardly and forwardly relative to the basket 12. The first and second side walls 22 and 23 of the basket 12 are each provided with a wall portion 38 which extends outwardly from the outer surfaces thereof adjacent the junction between the base wall 18 and the first end wall 20. The wall portions 38 extend from a location above the junction between the base wall 18 and the first end wall 20 to a location located rearwardly of the junction between the base wall 18 and the first end wall 20 such that the first end portions 34 of the first and second front legs 26 and 27 rest on upper surfaces of the wall portions 38 in the extended position. The wall portions 38 thereby prevent rotation of the front wheel support frame 14 beyond the extended position.

The first end portions 34 of the first and second rear legs 28 and 29 are oriented to extend from adjacent the second end wall 21 in a direction downwardly and forwardly relative to the basket 12 when the rear legs 28 and 29 are in the extended position. The second end portions 35 of the first and second rear legs 28 and 29 extend from the first end portions 34 in a direction downwardly and rearwardly relative to the basket 12. The recessed portions 36 in the first and second side walls 22 and 23 of the basket 12 each define a first shoulder portion 40. The first shoulder portion 40 extends from a location located above the junction between the base wall 18 and the second end wall 21 to a location located forwardly of the junction between the base wall 18 and the second end wall 21 such that the first end portions 34 of the first and second rear legs 28 and 29 rest under the first shoulder portion 40 in the extended position. The first shoulder portions 40 thereby prevent rotation of the rear legs 28 and 29 beyond the extended position.

The angle of the second portions 35 of the front legs 26 and 27 and the rear legs 28 and 29 is such that the weight of the basket 12 in use will tend to push the front and rear legs 26, 27, 28, 29 away from each other. However, further rotation of the front and rear legs 26, 27, 28, 29 is prevented by engagement with the wall portion 38 and the first shoulder portion 40.

Outer surfaces of the first and second side walls 22 and 23 of the basket 12 include second shoulder portions 50. The second shoulder portions 50 define a downwardly facing surfaces extending along the first and second side walls 22 and 23 from adjacent the first end wall 20 to adjacent the second end wall 21. The downwardly facing surfaces of the second shoulder portions 50 correspond to the shape of the first and second front legs 26 and 27 such that the first and second front legs 26 and 27 engage against the downwardly facing surface of the second shoulder portion 50 in the collapsed position. In the collapsed position, the wheels 30 of the first and second front legs 26 and 27 are located adjacent the second end wall 21 of the basket 12.

Figure 13:
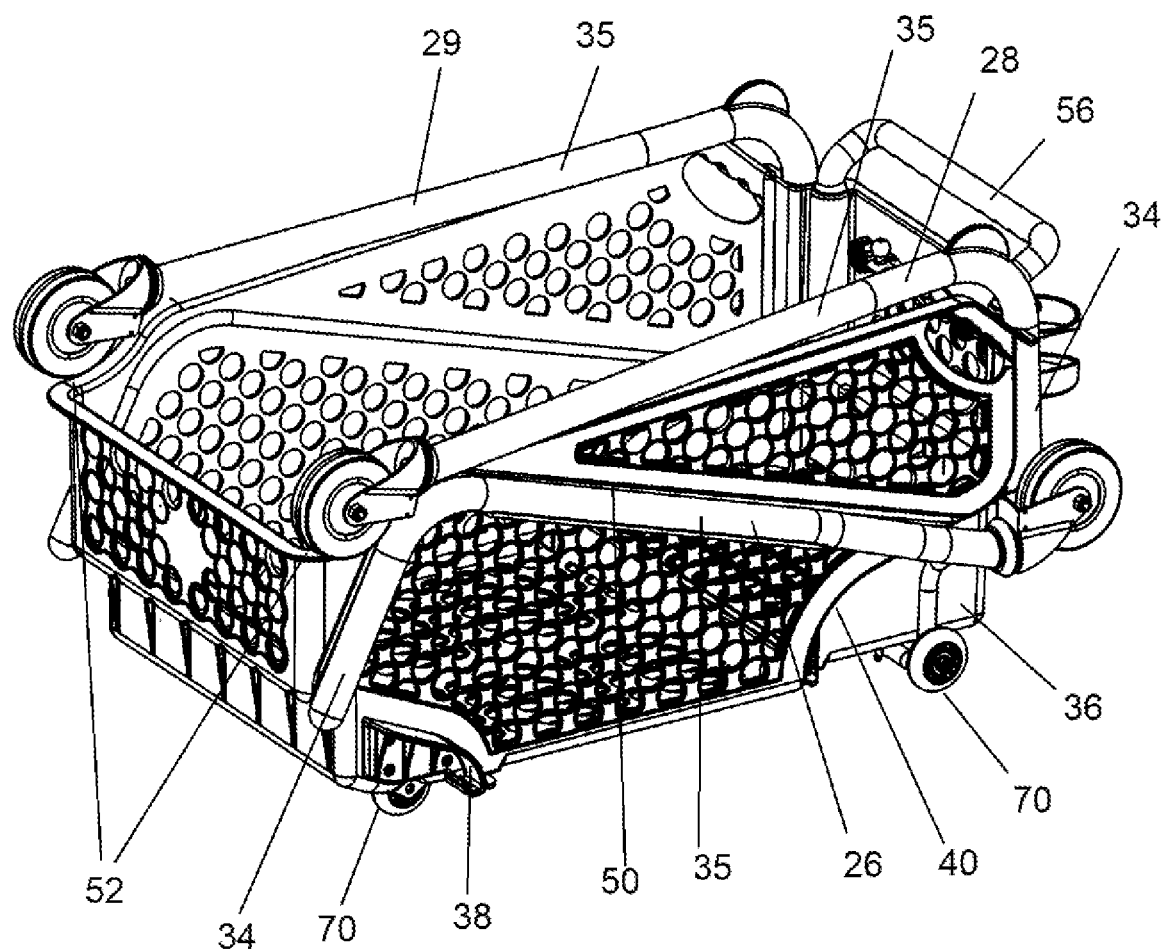
FIG. 13 is an upper perspective view of the shopping trolley showing the front and rear wheel support frames in the collapsed position.
Figure 14:
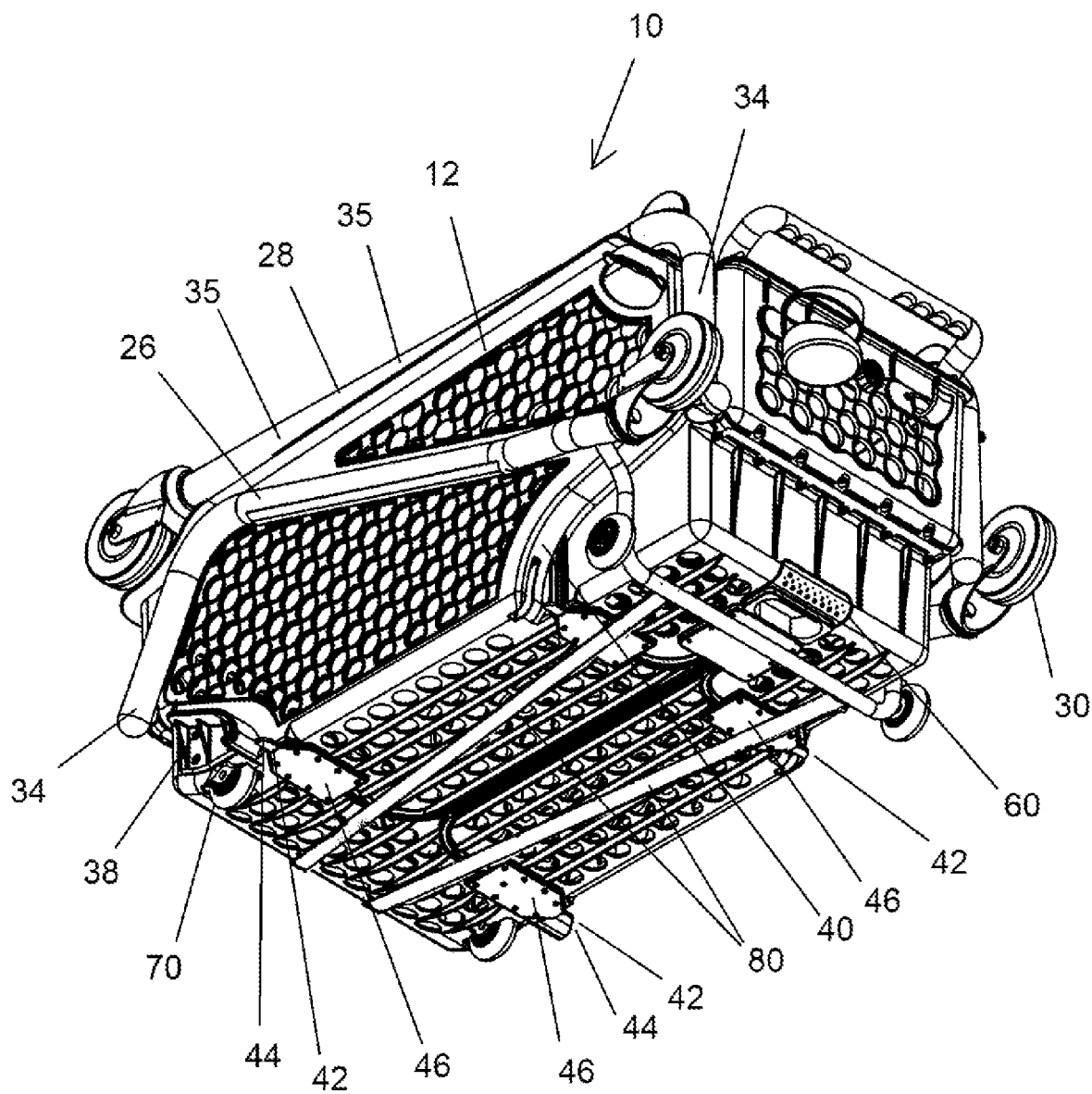
FIG. 14 is a lower perspective view of the shopping trolley in the collapsed position.
Figure 15:
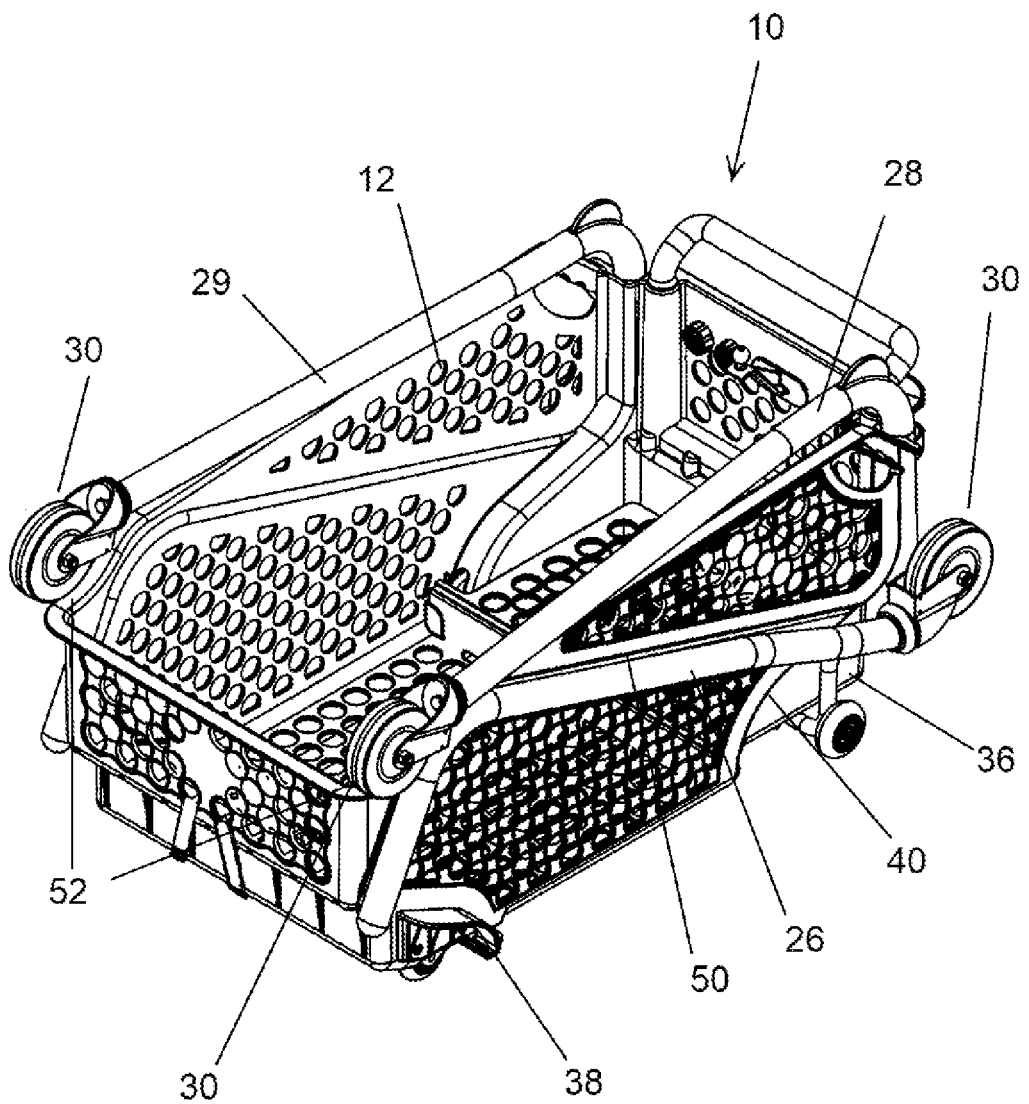
FIG. 15 is a second upper perspective view of the shopping trolley in the collapsed position.
Figure 16:
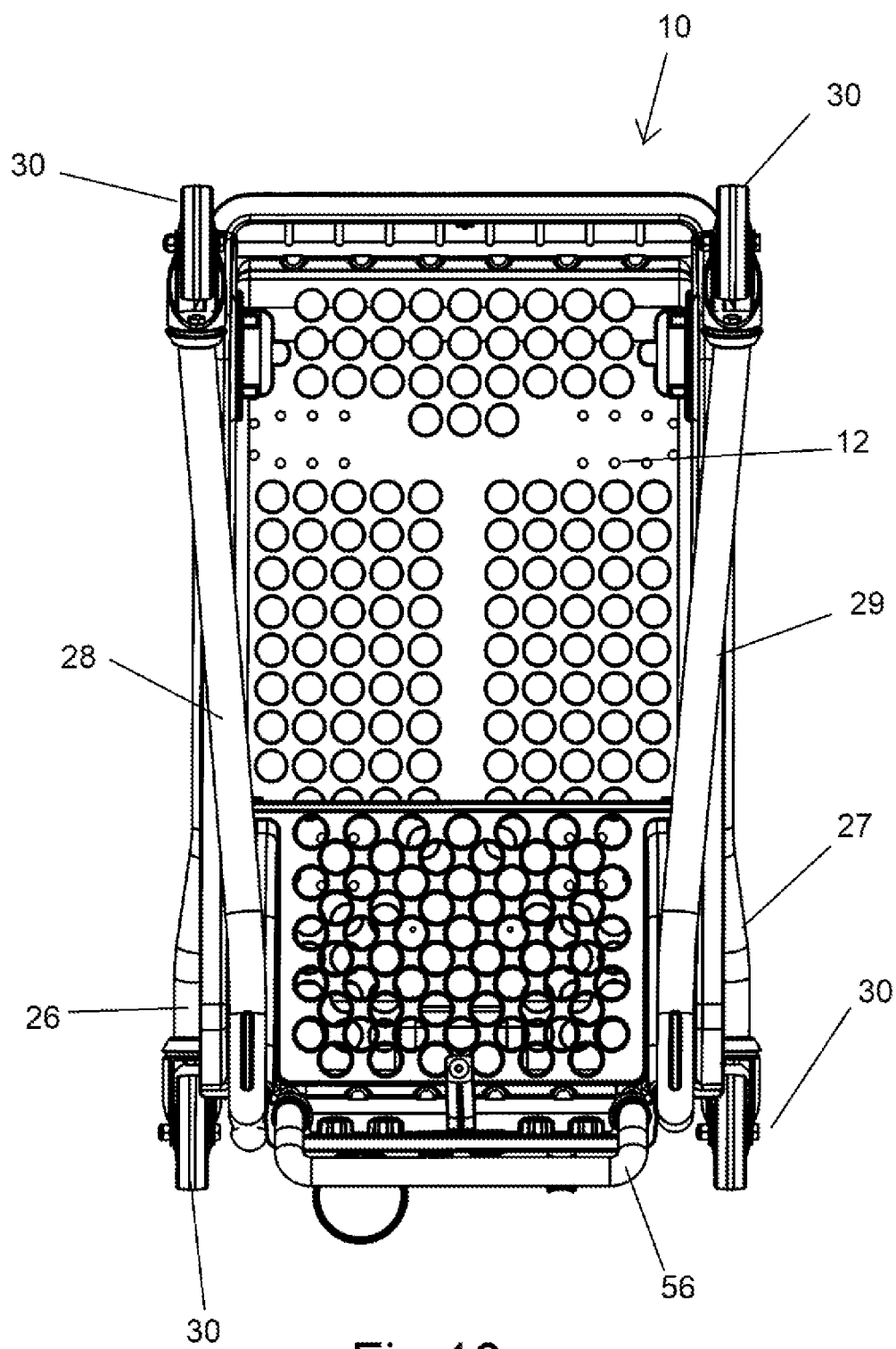
FIG. 16 is a top view of the shopping trolley in the collapsed position.

The legs 28 and 29 rotate such that, in the collapsed position, the first end portions 34 of the first and second rear legs 28 and 29 are located adjacent rear edges of the first and second side walls 22 and 23. The second end portions 35 of the first and second rear legs 28 and 29 in the collapsed position are located adjacent and above upper edges of the first and second side walls 22 and 23, as can be seen in FIG. 13. The upper edges of the first and second side walls 22 and 23 each include a recessed end portions 52 adjacent the first end wall 20 such that the recessed end portions 52 receive the wheels 30 of the rear legs 28 and 29 in the collapsed position.

The front and rear legs 26, 27, 28 and 29 are maintained in the extended positions by locking members 42. The locking members 42 engage with each of the front and rear legs 26, 27, 28 and 29 to restrict rotation away from the extended positions. The locking members 42 may be disengaged to allow rotation of the front and rear legs 26, 27, 28, 29 from the extended positions towards the collapsed positions thereof. When rotating toward the collapsed positions, the front and rear wheel legs 26, 27, 28, 29 all rotate rearwardly relative to the basket 12.

Figure 17:
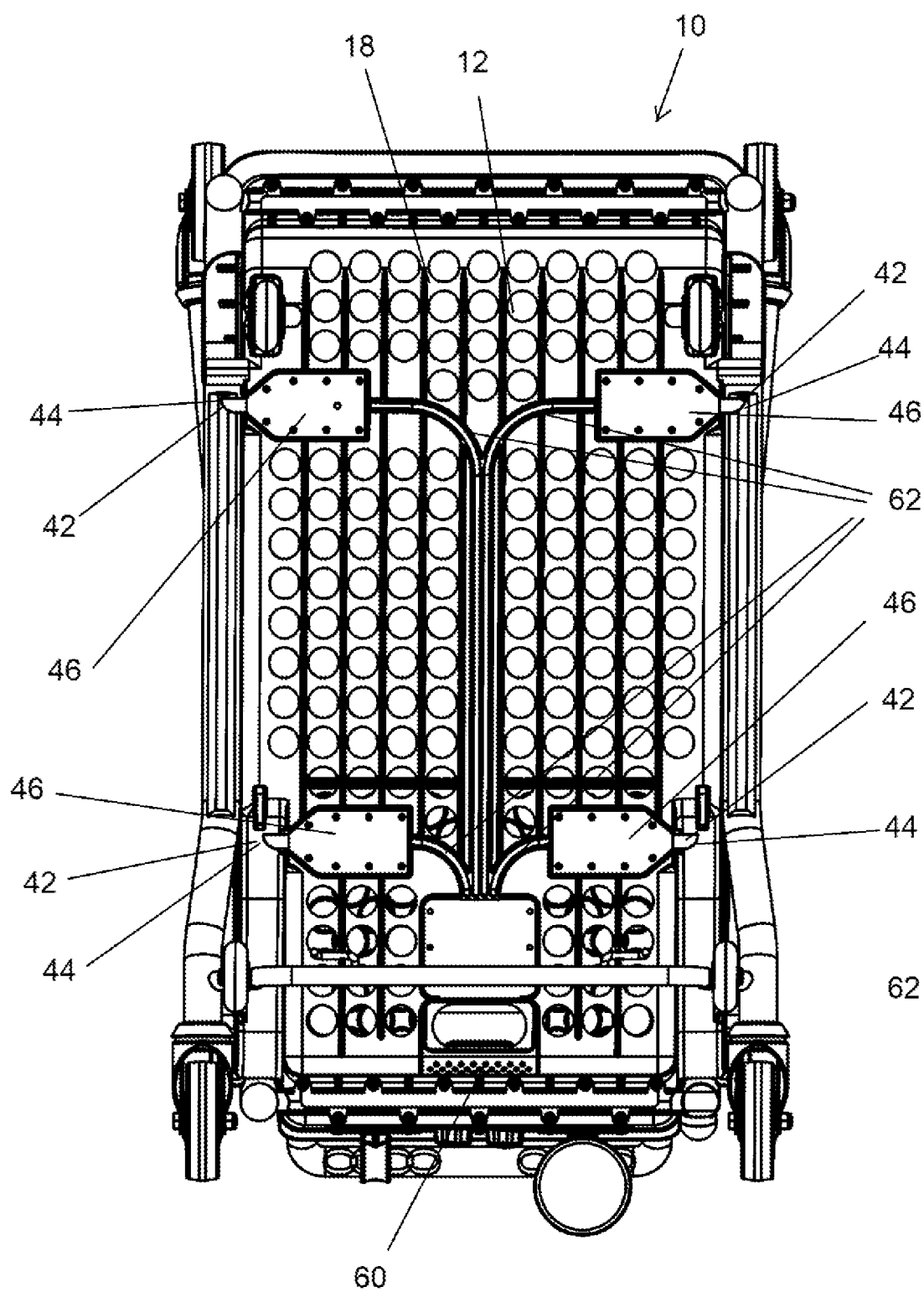
FIG. 17 is a bottom view of the shopping trolley in the collapsed position.
Figure 18:
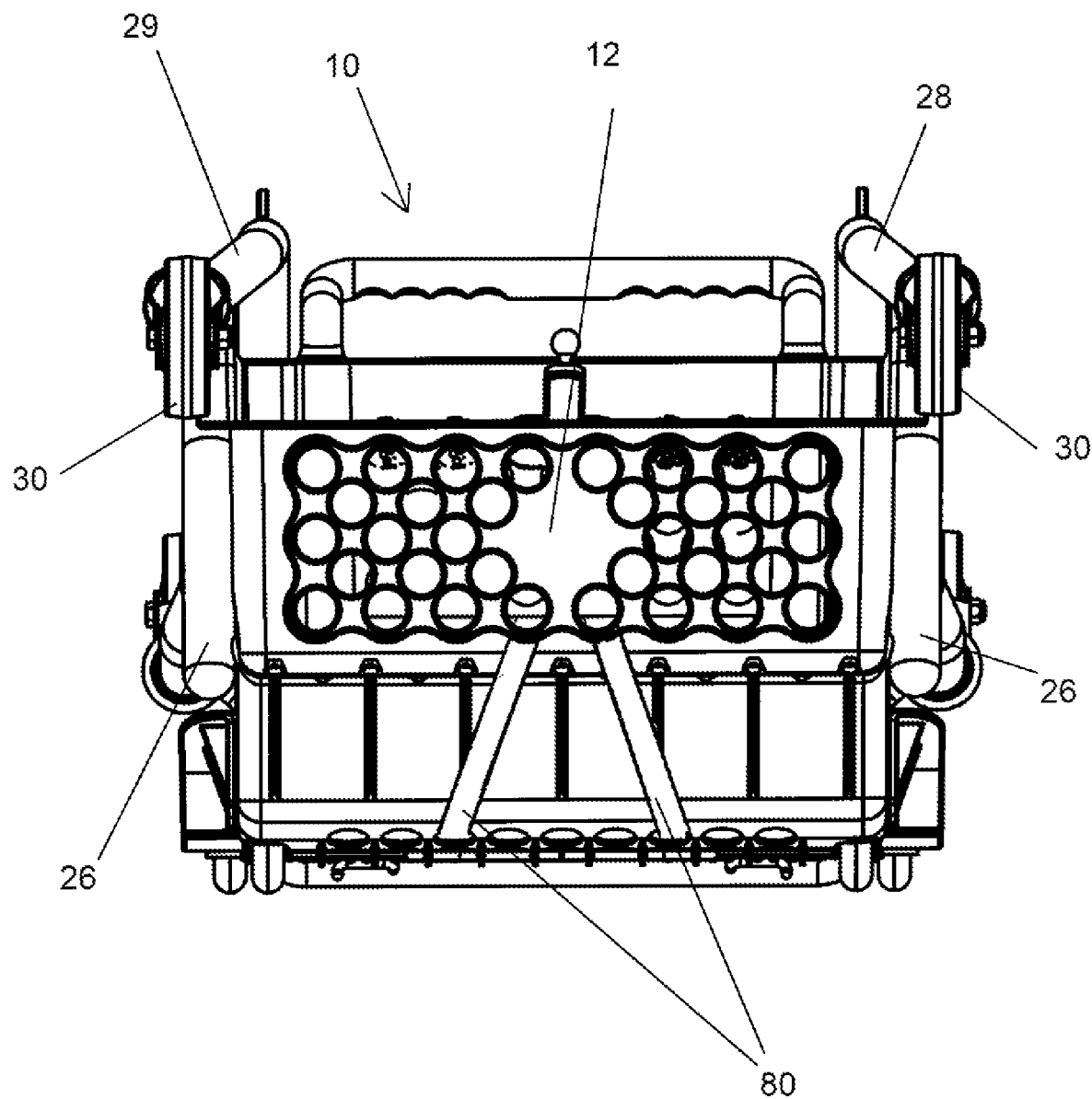
FIG. 18 is a front view of the shopping trolley in the collapsed position.
Figure 19:
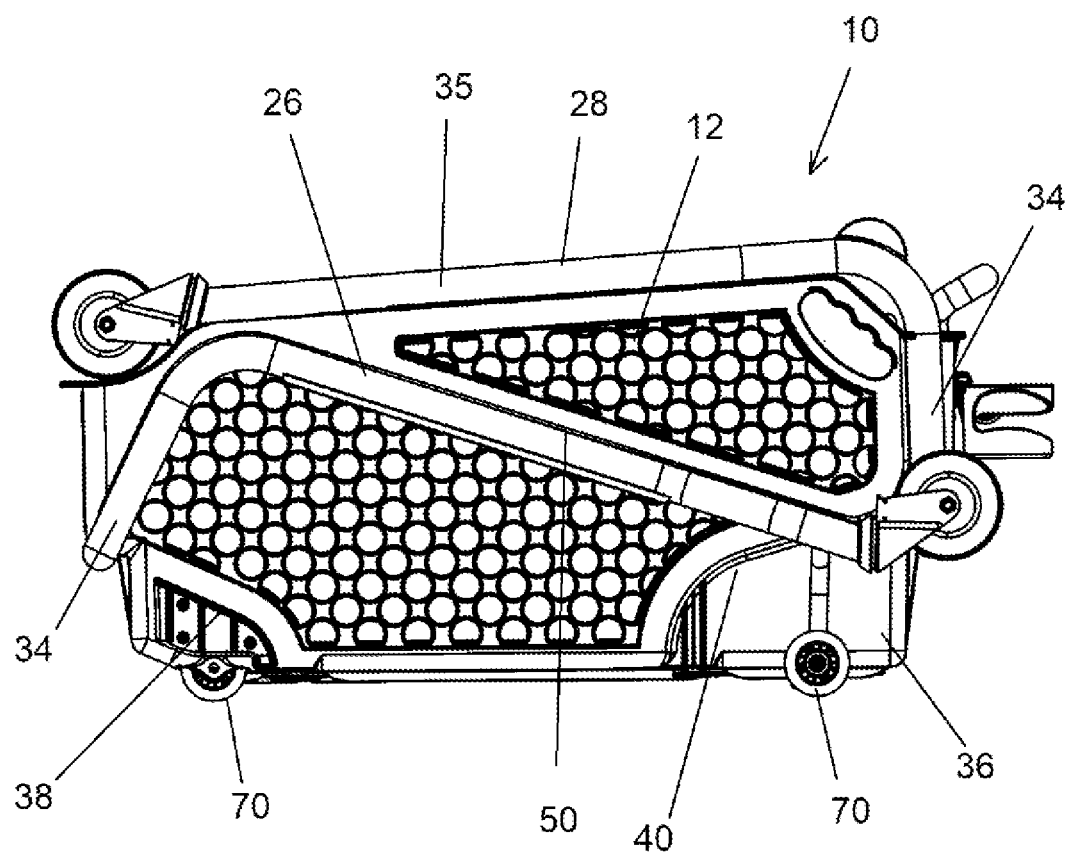
FIG. 19 is a side view of the shopping trolley in the collapsed position.

Each of the locking members 42 comprises a pin 44 mounted with a housing 46 provided on a lower surface of the base wall 18 (as best seen in FIG. 17). Each of the front and rear legs 26, 27, 28 and 29 is provided with a corresponding housing 46 having a pin 44 mounted on the base wall 18 adjacent the leg 26, 27, 28, 29 when the leg 26, 27, 28, 29 is in the extended position.

The pins 44 are spring biased relative to the respective housings 46 such that a distal end of each of the pins 44 is moved outwardly by the spring bias to engage into a hole provided on the adjacent leg 26, 27, 28, 29. As the legs 26, 27, 28, 29 move to the extended positions, the legs 26, 27, 28, 29 engage with ends of the adjacent pins 44 and push the pins 44 inwardly into the housings 46. When the ends of the pins 44 align with the holes on the legs 26, 27, 28, 29, the pins 44 move into the holes to lock the legs 26, 27, 28, 29 in the extended positions.

The shopping trolley 10 includes an actuator connected to each of the pins 44 such that operation of the actuator retracts the pins 44 away from the legs 26, 27, 28, 29. The actuator includes a handle 60 mounted adjacent a rear edge of the base wall 18 of the basket 12. The handle 60 is connected to cables 62 extending along the lower surface of the basket 12 to the housings 46. The cables 62 are connected to the pins 44 such that operation of the handle 60 causes retraction of the pins 44 inwardly away from the legs 26, 27, 28, 29.

The front and rear legs 26, 27, 28, 29 may thereby be released for movement to the collapsed positions by pulling the handle 60, thereby allowing the legs 26, 27, 28, 29 to rotate rearwardly (as shown in FIGS. 9 to 13). The first and second front legs 26 and 27 pass either side of the first and second rear legs 28 and 29 thereby applying a force to the rear legs 28 and 29 to rotate the rear legs 28 and 29 towards the collapsed position. The first and second rear legs 28 and 29 are engaged by the front cross member 32 as the first and second front legs 26 and 27 pass outside the first and second rear legs 28 and 29. The front cross member 32 in the embodiment shown comprises a U-shaped member extending forwardly of the first and second front legs 26 and 27.

The shopping trolley 10 is also provided with secondary wheels 70 to allow the shopping trolley 10 to be moved around while the legs 26, 27, 28, 29 are in the collapsed position. A first pair of secondary wheels 70 is provided on a lower surface of the base wall 18 of the basket 12 adjacent the first end wall 20. A second pair of secondary wheels 70 is provided on the front cross member 32. The second pair of secondary wheels 70 are provided such that the first and second pairs of secondary wheels 70 engage with the ground when the front and rear legs 26, 27, 28, 29 are in the collapsed position. The shopping trolley 10 may therefore be rolled on the secondary wheels 70 when the legs 26, 27, 28, 29 are collapsed.

The shopping trolley 10 includes one or more straps 80 extending between the basket 12 and the front wheel support frame 14. The straps 80 extend between a front end of the basket 12 such that the straps extend downwardly from the basket 12 to connect to the front wheel support frame 14 at a location below the basket 12. In the embodiment shown, there are provided two such straps 80 which have first ends connected to the first end wall 20 of the basket 12 and second ends connected to the front cross member 32. The first end of the straps 80 are connected centrally on the first end wall 20 of the basket 12 and the second ends are separated and secured at locations on the front cross member 32.

The straps 80 are elasticised and provided to engage with a rear end of a vehicle 11 (as can be seen in FIG. 21) when the forward end of the shopping trolley 10 is moved towards the vehicle 11. The position of the straps 80 causes the straps 80 to engage with the rear end of the vehicle 11 before the front wheel support frame 14 as can be seen. Engagement between the straps 80 and the vehicle 11 aids in moving the front wheel support frame 14 to the collapsed position. When the front wheel support frame 14 is in the collapsed position, the straps 80 extend across the base wall 18 of the basket 12. The elastic nature of the straps 80 also acts to pull the front wheel support frame 14 back to the extended position when unfolding the legs 26, 27, 28, 29.

The basket 12 also includes a handlebar 56. The handlebar 56 extends upwardly from the upper edge of the second end wall 21 and may be used to move the shopping trolley 10 on either the wheels 30 or the secondary wheels 70.

Figure 8:
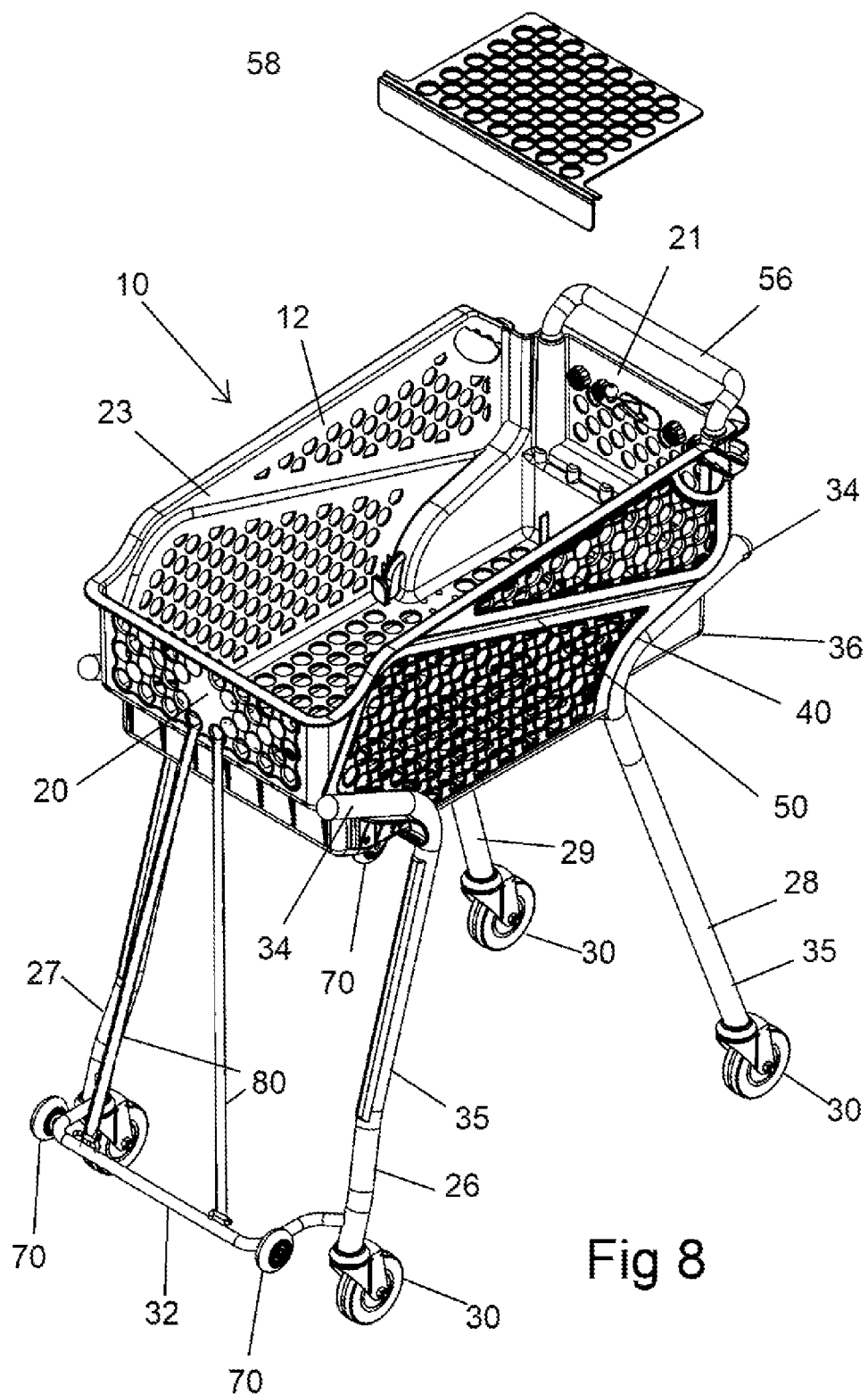
FIG. 8 is an upper perspective view of the shopping trolley of FIG. 1 showing an inner cover member removed.
Figure 9:
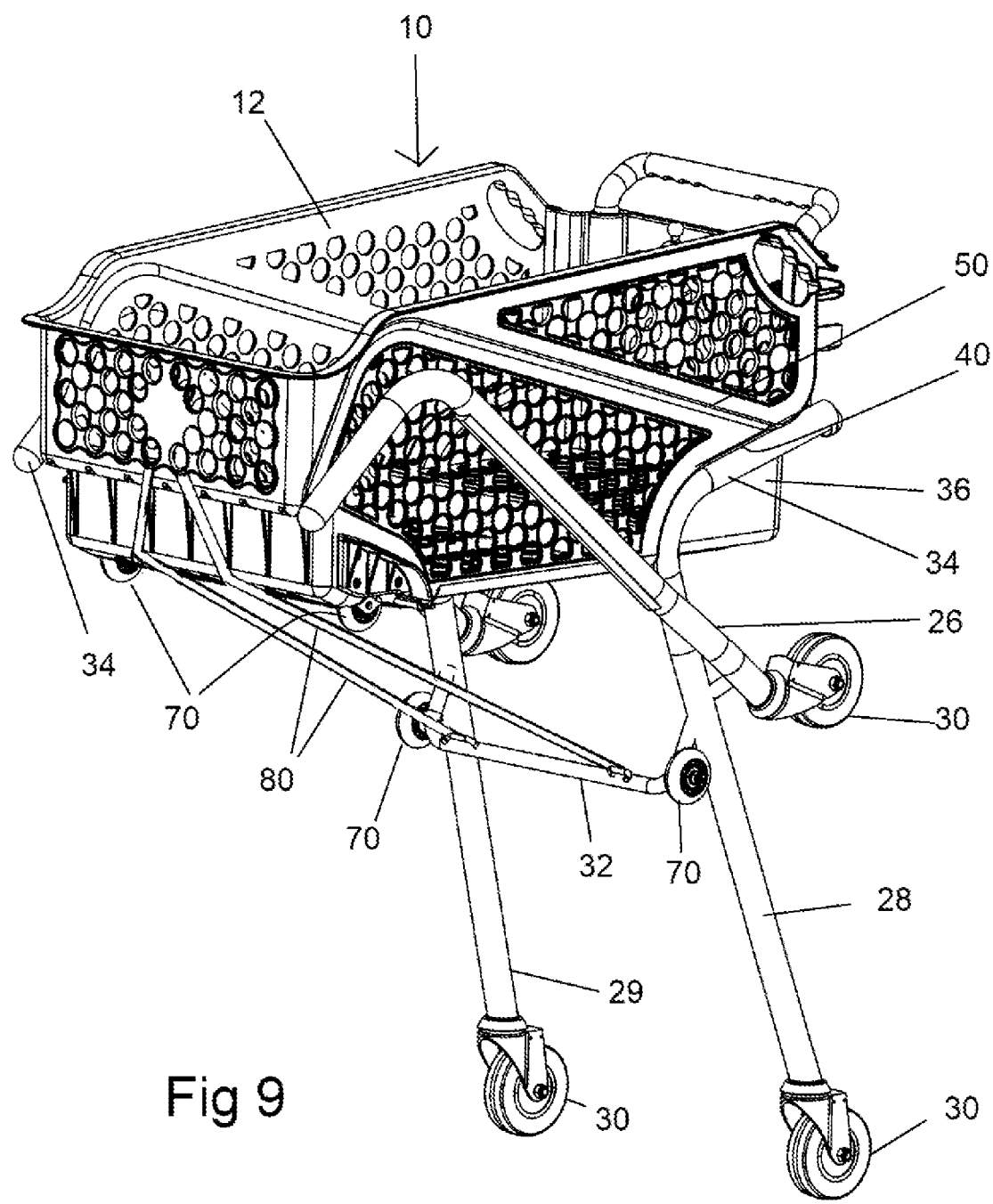
FIG. 9 shows the front wheel support frame of the shopping trolley partially rotated from the extended position to the collapsed position.
Figure 10:
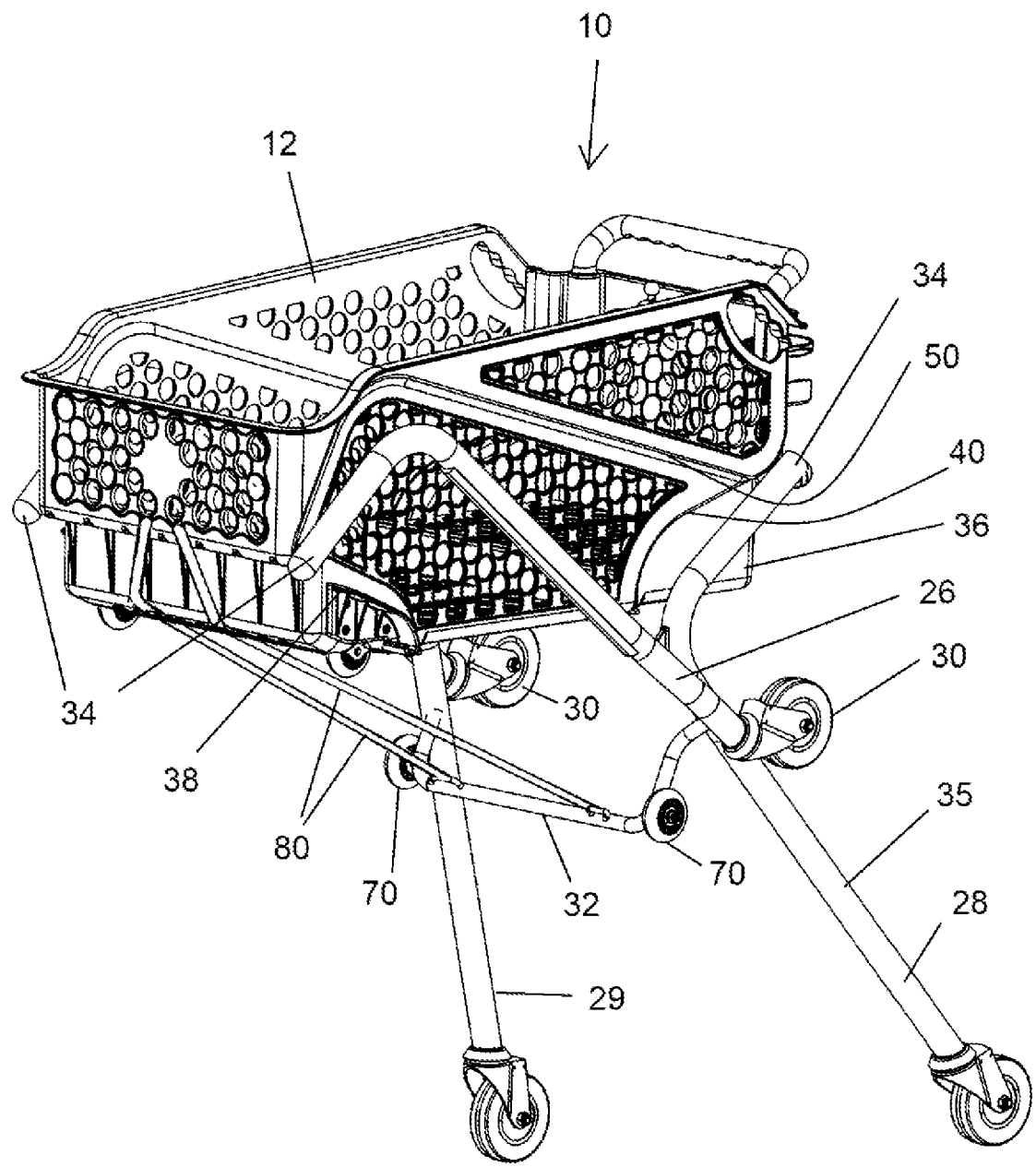
FIG. 10 shows a first of the rear legs rotating from the extended position toward the collapsed position.
Figure 11:
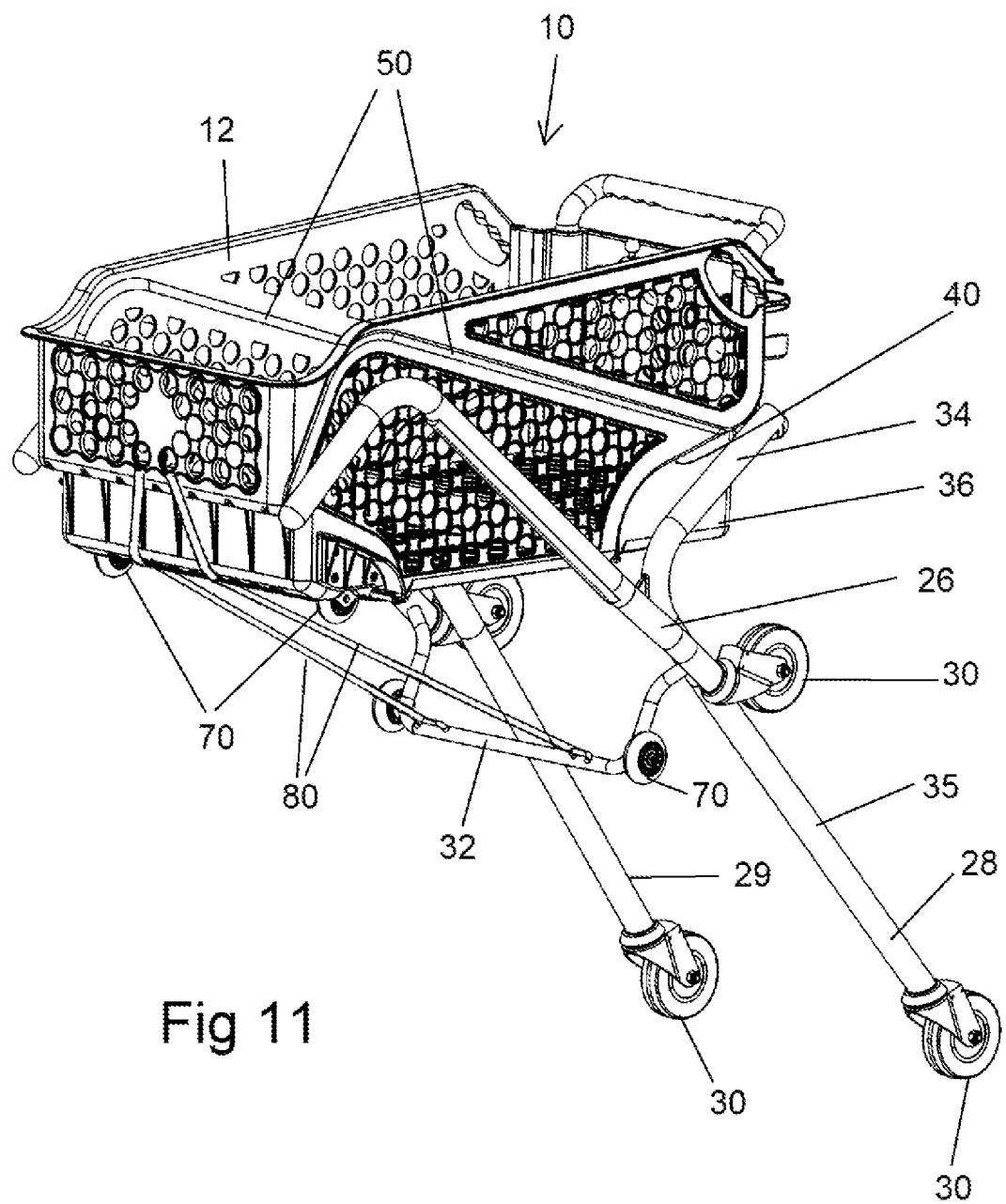
FIG. 11 shows a second of the rear legs rotating from the extended position toward the collapsed position.
Figure 12:
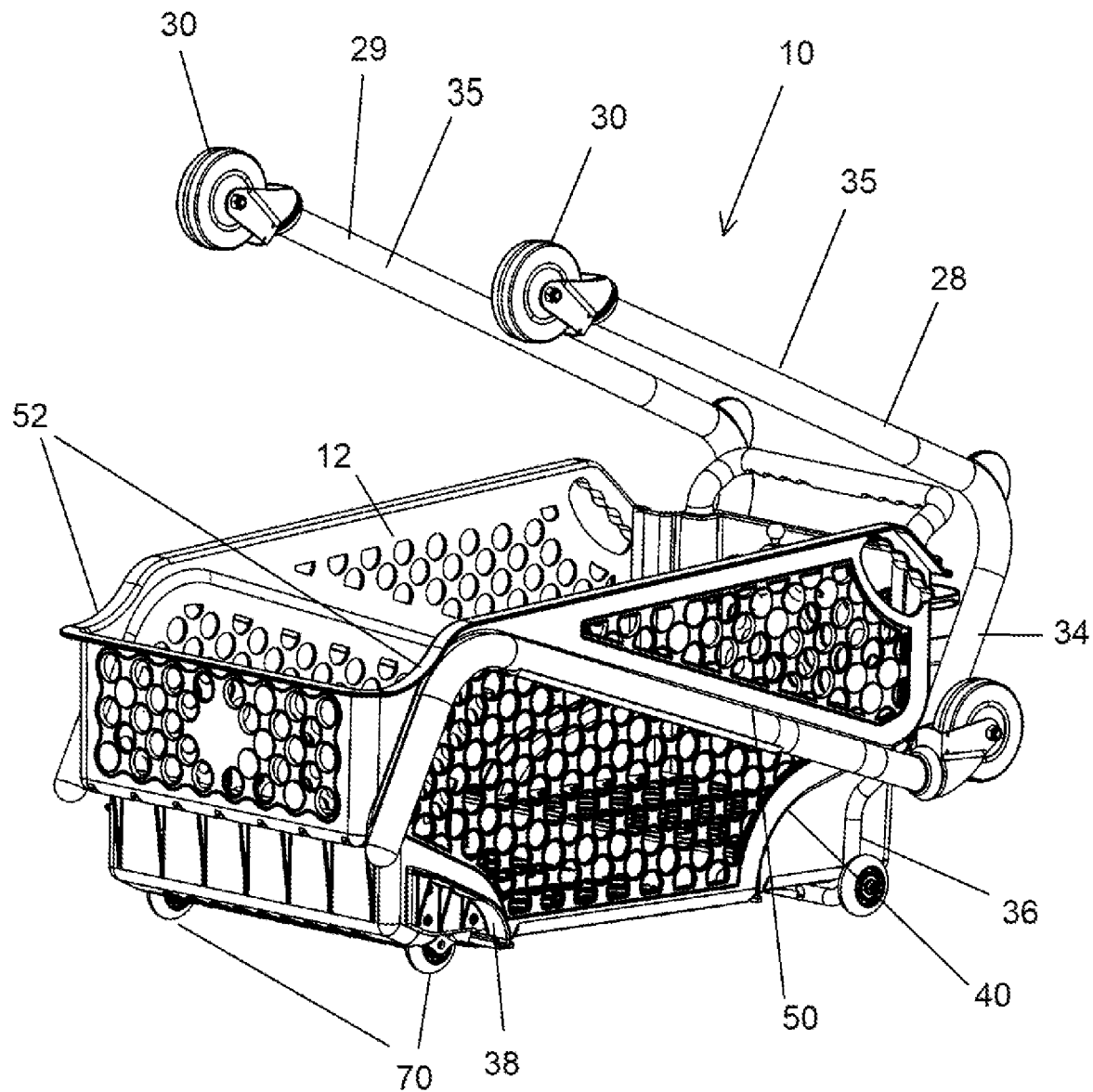
FIG. 12 shows both of the rear legs rotating further toward the collapsed position.
Figure 20:
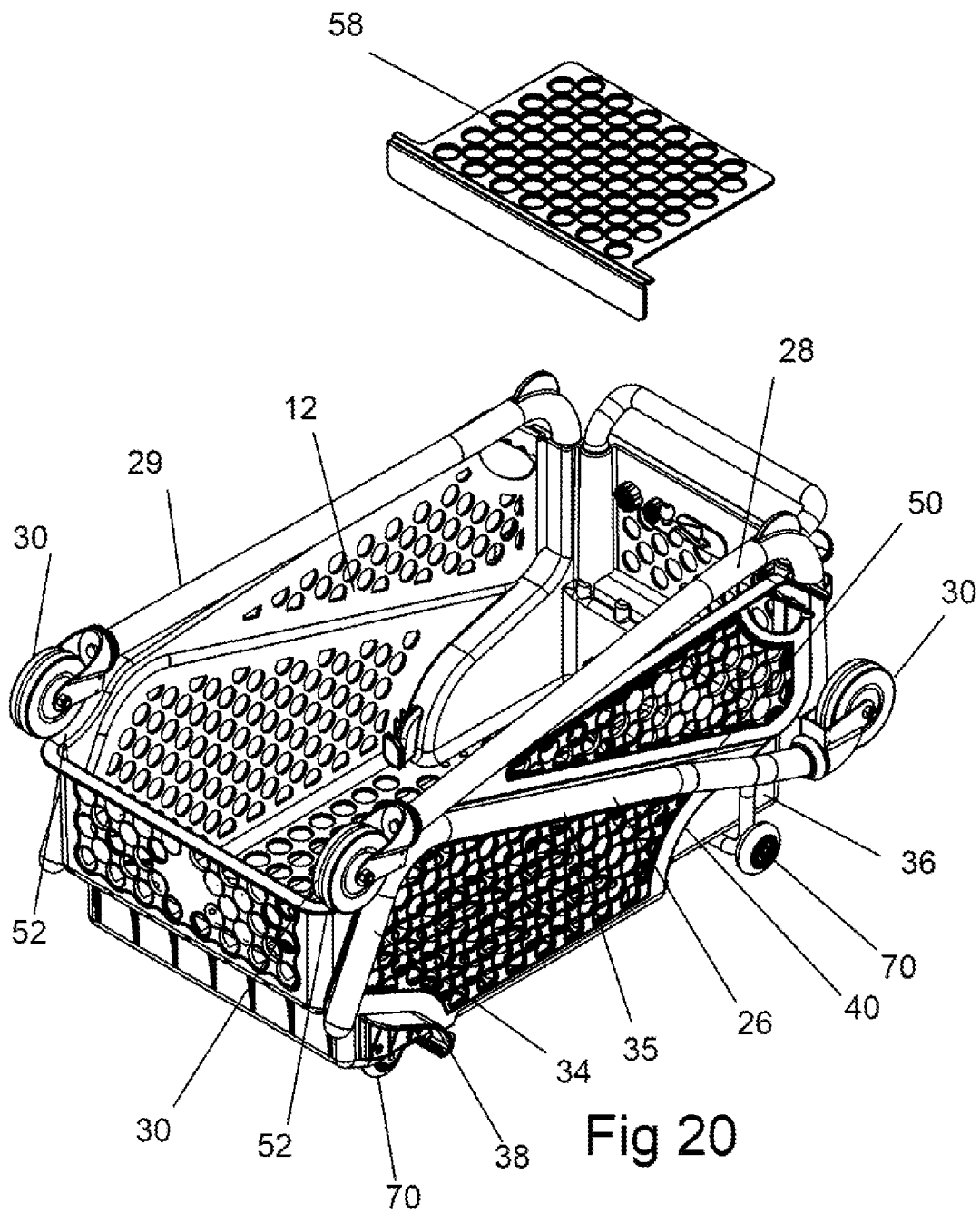
FIG. 20 is an upper perspective view of the shopping trolley in the collapsed position showing the inner cover member removed.

An upper surface of the base wall 18 is provided with a cover member 58 (as can be seen in FIGS. 8 and 20). The cover member 58 is provided to be secured above a portion of the base wall 18. The cover member 58 may be secured in a first position (as shown in the Figures) in which the planar cover member 58 is adjacent and parallel to the base wall 18 to define a cavity between the cover 58 and the base wall 18 which may be used to hold personal items. The cover member 58 may also be removed and attached to the basket 12 in a second position (not shown), in which the planar cover member 58 is oriented perpendicular to the base wall 18. In the second position, the cover member 58 thereby defines a divider within the basket 12 to divide the interior of the basket 12 into multiple compartments.

The front and rear wheel legs 26, 27, 28 and 29 may further be provided with one or more connecting members. The connecting members are provided to connect the front legs 26, 27 with the respective rear legs 28, 29 when the front and rear legs 26, 27, 28, 29 are in the extended positions. The connecting members may comprise flexible cords releasably connectable between the front and rear legs 26, 27, 28, 29 when in the extended positions. The connecting members may also comprise rigid members rather than flexible cords. The connecting members may be provided to further secure the front legs 26, 27 relative to the rear legs 28, 29 in the extended positions.

In use, the shopping trolley 10 may be used in a supermarket in a known manner to collect items with the front and rear legs 26, 27, 28, 29 in the extended positions. The front and rear wheel legs 26, 27, 28, 29 of the shopping trolley 10 may be rotated to the collapsed positions in order to place the shopping trolley 10 into the rear of a vehicle 11. The handle 60 is operated and the front wheel support frame 14 will rotate backwardly towards the collapsed position as the basket 12 is moved into the rear of the vehicle. The rear legs 28, 29 may then be rotated to the collapsed position above the upper edge of the basket 10. When the front and rear legs 26, 27, 28, 29 are in the collapsed positions, the legs 26, 27, 28, 29 do not extend significantly beyond the extents of the basket 12. The shopping trolley 10 therefore provides a relatively compact form which may be easily stored in the rear of a vehicle.

As the rear legs 28 and 29 of the rear wheel support frame 16 are located above upper edges of the side walls 22 and 23, the open upper side of the basket 12 is therefore still easily accessible while the legs 26, 27, 28, 29 are in the collapsed position. It is therefore still relatively easy for items to be taken out of or inserted into the basket 12. When the shopping trolley 10 is to be removed from the car, the legs 26, 27, 28, 29 are rotated back to the extended positions as the basket 12 is pulled from the vehicle. The shopping trolley 10 may therefore be removed from the car 11 and wheeled into the home of the consumer for unpacking the purchased items.

Front sides of the front legs 26 and 27 may be provided with protective strips 72 along portions of the length. The protective strips are provided to protect the rear of the vehicle 11 should the front legs 26 and 27 engage against the rear of the vehicle 11.

It will be readily apparent to persons skilled in the relevant arts that various modifications and improvements may be made to the foregoing embodiments, in addition to those already described, without departing from the basic inventive concepts of the present invention.

What is claimed is:

1. A shopping trolley comprising:
    a basket having first and second side walls, first and second end walls and a base wall;
    first and second front legs, each having a wheels on a lower end thereof; and
    first and second rear legs, each having a wheel on a lower end thereof;
    wherein the first and second front legs are rotatable from an extended position, in which the first and second front legs extend downwardly from adjacent a front of the basket, to a collapsed position, in which the first and second front legs are located adjacent outer sides of the first and second side walls of the basket respectively, and the rear legs are rotatable from an extended position, in which the first and second rear legs extend downwardly from adjacent a rear of the basket, to a collapsed position, in which portions of the first and second rear legs are located adjacent and above upper edges of the first and second side walls of the basket respectively; and
    wherein the first and second front legs are rotatably connected to outer surfaces of the side walls of the basket and the first and second rear legs are rotatably connected to the basket within recessed portions of the first and second side walls.

2. The shopping trolley in accordance with claim 1, wherein the first and second rear legs are receivable inside the first and second front legs as the front legs move from the extended to the collapsed position.

3. The shopping trolley in accordance with claim 2, wherein a front cross member extends between the first and second front legs such that the front cross member engages the first and second rear legs as the front legs move to the collapsed position.

4. The shopping trolley in accordance with claim 1, wherein the first and second front legs and the first and second rear legs each include a first end portion adjacent the first end thereof and a second end portion extending from the first end portion to the second end wherein the second portion is at an angle to the first end portion.

5. The shopping trolley in accordance with claim 4, wherein when the front and rear legs are in the extended positions, the first end portions of the first and second front legs are oriented to extend from adjacent the first end wall in a direction downwardly and rearwardly relative to the basket, the second end portions of the first and second front legs extend from the first end portions in a direction downwardly and forwardly relative to the basket, the first end portions of the first and second rear legs are oriented to extend from adjacent the second end wall in a direction downwardly and forwardly relative to the basket and the second end portions of the first and second rear legs extend from the first end portions in a direction downwardly and rearwardly relative to the basket.

6. The shopping trolley in accordance with claim 4, wherein the first end portions of the first and second front legs are rotatably connected to the basket on outer surfaces of the first and second side walls respectively adjacent the first end wall and the first end portions of the rear legs are rotatably connected to the basket within the recessed portions located adjacent the second end wall.

7. The shopping trolley in accordance with claim 6, wherein the first and second side walls of the basket are each provided with an outwardly extending wall portion extending from a location above the junction between the base wall and the first end wall to a location located rearwardly of the junction between the base wall and the first end wall such that the first end portions of the first and second front legs rest on upper surfaces of the wall portions in the extended position.

8. The shopping trolley in accordance with claim 4, wherein the recessed portions in the first and second side walls each define a first shoulder portion extending from a location above the junction between the base wall and the second end wall to a location forwardly of the junction between the base wall and the second end wall such that the first end portions of the first and second rear legs rest under the first shoulder portions in the extended position.

9. The shopping trolley in accordance with claim 4, wherein, in the collapsed position, the first end portions of the first and second rear legs are located adjacent rear edges of the first and second side walls and the second end portions of the first and second rear legs are located adjacent and above upper edges of the first and second side walls.

10. The shopping trolley in accordance with claim 9, wherein the upper edges of the first and second side walls each include a recessed end portion adjacent the first end wall such that the recessed end portions receive the wheels of the first and second rear legs in the collapsed position.

11. The shopping trolley in accordance with claim 4, wherein outer surfaces of the first and second side walls of the basket include second shoulder portions defining downwardly facing surfaces extending along the first and second side walls from adjacent the first end wall to adjacent the second end wall, the downwardly facing surfaces of the second shoulder portions corresponding to the shape of the first and second front legs such that the first and second front legs engage against the downwardly facing surfaces of the second shoulder portions in the collapsed position.

12. The shopping trolley in accordance with claim 1, wherein the front and rear legs are maintained in the extended positions by locking members.

13. The shopping trolley in accordance with claim 12, wherein the locking members extend outwardly from the first and second side walls to engage with each of the front and rear legs to restrict rotation of the front and rear wheel support frames away from the extended position.

14. The shopping trolley in accordance with claim 13, wherein the locking members each comprises a pin mounted with a housing provided on a lower surface of the base wall such that each of the pins is extendible outwardly from the base wall to engage into a hole in one of the front or rear legs.

15. The shopping trolley in accordance with claim 14, wherein the pins are spring biased relative to the respective housings such that a distal end of each of the pins is moved outwardly by the spring bias to engage into the hole.

16. The shopping trolley in accordance with claim 15, wherein an actuator is connected to each of the pins such that operation of the actuator retracts the pins away from the legs to release the front and rear wheel support frames to rotate towards the collapsed position.

17. The shopping trolley in accordance with claim 16, wherein the actuator comprises a handle mounted adjacent a rear edge of the base wall of the basket connected via cables to the housings such that operation of the handle causes retraction of the pins.

18. The shopping trolley in accordance with claim 1, wherein secondary wheels are provided on which the shopping trolley may be moved when the front and rear support frames are in the collapsed position.

19. The shopping trolley in accordance with claim 18, wherein a first pair of secondary wheels is provided on a lower surface of the base wall of the basket adjacent the first end wall and a second pair of secondary wheels is provided on a front cross member extending between the first and second front legs.

20. The shopping trolley in accordance with claim 1, wherein one or more straps is provided extending from a front end of the basket to the front wheel support frame such that the straps engage with a rear of a vehicle before the front wheel support frame.

21. The shopping trolley in accordance with claim 20, wherein the straps are elasticised.

22. The shopping trolley in accordance with claim 20, wherein the straps have first ends connected to a first end wall of the basket and second ends connected to a first cross member extending between the first and second front legs.

23. A shopping trolley comprising:
    a basket having first and second side walls, first and second end walls and a base wall;
    first and second front legs, each having a wheels on a lower end thereof; and
    first and second rear legs, each having a wheel on a lower end thereof;
wherein the first and second front legs are rotatable from an extended position, in which the first and second front legs extend downwardly from adjacent a front of the basket, to a collapsed position, in which the first and second front legs are located adjacent outer sides of the first and second side walls of the basket respectively, and the rear legs are rotatable from an extended position, in which the first and second rear legs extend downwardly from adjacent a rear of the basket, to a collapsed position, in which portions of the first and second rear legs are located adjacent and above upper edges of the first and second side walls of the basket respectively;
    wherein the first and second front legs and the first and second rear legs each include a first end portion adjacent the first end thereof and a second end portion extending from the first end portion to the second end wherein the second portion is at an angle to the first end portion; and wherein when the front and rear legs are in the extended positions, the first end portions of the first and second front legs are oriented to extend from adjacent the first end wall in a direction downwardly and rearwardly relative to the basket, the second end portions of the first and second front legs extend from the first end portions in a direction downwardly and forwardly relative to the basket, the first end portions of the first and second rear legs are oriented to extend from adjacent the second end wall in a direction downwardly and forwardly relative to the basket and the second end portions of the first and second rear legs extend from the first end portions in a direction downwardly and rearwardly relative to the basket.

* * * * *